United States Patent Office 3,280,062
Patented Oct. 18, 1966

3,280,062
METHOD FOR OBTAINING COMPOSITIONS CONTAINING PETROLEUM WAX AND POLYETHYLENE
Eugene E. Richardson, Highland, Ind., assignor to Standard Oil Company, Chicago, Ill., a corporation of Indiana
No Drawing. Filed Dec. 23, 1960, Ser. No. 77,828
5 Claims. (Cl. 260—28.5)

This invention relates to petroleum wax compositions. More particularly it relates to paraffin wax compositions of improved gloss stability containing small amounts of wax-soluble polyethylene.

Paraffin wax is principally used today as a coating for paper or paper-board products. Waxed paper has the special attribute of being very resistant to moisture transfer. So it is used as an outerwrap for many packages to protect the contents thereof either from absorption of or loss of moisture therefrom. Consequently, the gloss characteristics of waxed paper is of special importance when such paper is used as an overwrap in the packaging of many products. Gloss is very important when waxed paper has been color printed, for such paper is usually used as packaging material for products which are sold in self-service stores. Therefore appearance is critical. Waxed paper having good initial gloss can normally be prepared by applying a film of wax to the paper at a temperature well above the wax melting point and cooling very rapidly by immersion in cold water. However, such waxed paper while having good initial gloss often loses it after a few days or weeks. Further, any tendency to lose gloss is usually accentuated by varying storage temperatures. The modification of wax to inhibit the loss of the gloss of waxed paper is therefore of value.

Many materials have been added to wax in recent years to improve one or more of its functional properties. For example, polyethylene has been found to be a beneficial additive for improving many of the functional properties of paraffin wax, one of which is maintenance of the gloss of waxed paper. However, the addition of polyethylene to paraffin wax has created new problems. By way of illustration, it has been found that the storage stability of polyethylene in wax compositions is poor. That is to say that when the polyethylene-wax product is stored in bulk the polyethylene tends to settle out. Also, such wax-polyethylene compositions have much greater viscosities than wax from which made. Consequently, the application of such compositions to paper is rendered more difficult. Another problem is the formation of haze or cloud in the wax-polyethylene compositions. Molten paraffin wax is normally clear. However, as has been described in the literature and patents during recent years, polyethylene is insoluble or immiscible with most of the well-known chemicals and is difficult to incorporate into wax. Consequently, normal polyethylene-wax compositions are heterogeneous and being heterogeneous have differential solidification temperatures. That is to say, that when such compositions are prepared at elevated temperatures, the cooling thereof causes the polyethylene to solidify at a temperature above the melting point of the wax. The temperature at which initial precipitation occurs is referred to as the cloud point. Such compositions are hazy for the polyethylene is dispersed as small particles in the wax at temperatures between the cloud point and solidification temperature of the blend. Haze is undesirable for the blend must be kept at temperatures at least 15° F. above the cloud point at the time of application. Otherwise the coating will be nucleated and discontinuous and of greater opacity due to the small polyethylene particles. As a consequence of these problems, the wax and paper industries have been seeking means for producing homogeneous polyethylene-wax compositions which will be haze free and not exhibit cloud, have stability during storage, be free of viscosity increase, and retain gloss.

Now, in accordance with the present invention, it has been found that gloss-unstable paraffin waxes are substantially improved with respect to gloss, cloud, storage stability, and viscosity by the incorporation therein of a gloss stabilizing amount of a paraffin wax-soluble polyethylene. More particularly, the present invention comprises wax products predominating in paraffin waxes having melting points within the range of from about 120° F. to about 140° F. and a minor amount of at least 0.01% of a paraffin wax-soluble polyethylene, preferably about 0.2% to about 10%.

Polyethylene now denotes a family of ethylene polymers differing widely in molecular weights, crystallinity, viscosity, specific gravity, and other properties. The polyethylene suitable for the production of the wax products according to the present invention is that fraction of polymerized ethylene which is soluble in paraffin wax; and hereinafter referred to in the specification and claims as "wax-soluble" polyethylene. It has been found that commercial polyethylenes contain varying amounts of wax-soluble material. Ethylene polymerization processes produce polyethylene of varying molecular weights, varying from amorphous low molecular weight material—commonly referred to as "grease"—to very crystalline products of high molecular weight. It has been found that the low molecular weight product heretofore deemed undesirable and waste in polymerization processes contain a fraction that is soluble in paraffin wax. Consequently, the grease is a valuable source of wax-soluble polyethylene for use in the present invention and presents a means for utilizing a type of polyethylene heretofore deemed uneconomical.

The major component of the wax products of the present invention comprise crystalline or paraffin waxes having melting points of from about 120° F. to about 140° F. and preferably from about 125° F. to about 140° F. Generally crystalline paraffin waxes are given a final treatment with clays or activated minerals to remove undesirable constituents and impurities to insure requisite color and odor.

For purposes of the present invention, the crude wax and commercial low molecular weight polyethylene are blended prior to said final treatment in the wax refining operations, and then given the final treatment. Alternatively, a concentrated blend of wax and wax-soluble polyethylene can be prepared by melting together crude or previously refined paraffin wax and low molecular weight polyethylene in approximately equal quantities at temperatures of from about 145° F. to about 200° F., and then filtering the wax-polyethylene blend. It has been found that conventional filter media, with or without the presence of filter aids such as celite, is sufficient to remove the polyethylene wax-insoluble fractions, which fractions are the cause of haze or cloud, viscosity increase and separation.

In the following examples which are illustrative of the present invention, gloss stability was determined in accordance with the procedure published in TAPPI, vol. 37, p. 400, No. 9, September 1954. Briefly, initial gloss of a waxed paper specimen is measured by percent light reflectance. The specimen is then stored at 72° F. and 50% relative humidity for seven days after which percent light reflectance is again measured. Stability is determined by change in percent reflectance. The less the change, the greater the stability.

EXAMPLE I

Four hundred grams of refined paraffin wax (M.P. 134° F.) containing 2 grams (0.5%) of Epolene C polyethylene was percolated with 30 grams of activated attapulgus clay at 150° F. for 18 hours. The resulting blend of wax-soluble polyethylene and wax was haze free at all temperatures and did not produce any cloud point.

EXAMPLE II

The procedure of Example I was repeated using 0.4 grams (0.1%) of Epolene C polyethylene. A haze free blend was obtained.

EXAMPLE III

Four hundred grams of refined paraffin wax (M.P. 134° F.) containing 0.8 grams (0.2%) of AC 6 polyethylene was percolated with 30 grams of activated attapulgus clay at 150° F. for 18 hours. The resulting wax blend was haze free.

EXAMPLE IV

Four hundred grams of refined paraffin wax (M.P. 134° F.) and 2 grams (0.5%) of Epolene C polyethylene were melted together at 140° F. and held for one hour. The mixture was then filtered with celite filter cell at 140° F. The filtrate was haze free.

The gloss stability of waxed paper prepared with the base wax and each of the polyethylene-wax blends obtained in Examples I–IV is shown in the following table:

| Coating | Gloss | | |
|---|---|---|---|
| | Initial | 7 days | 14 days |
| Paraffin wax (M.P. 134° F.) | 34 | 14 | |
| Blend of Example I | 36 | 37 | 35 |
| Blend of Example II | 33 | 29 | 24 |
| Blend of Example III | 37 | 32 | |
| Blend of Example IV | 37 | 36 | 35 |

EXAMPLE V

Seventy-five grams of AC 6 polyethylene was admixed with 1425 grams of refined paraffin wax at 150° F., held two hours, and filtered through celite at 150° F. The filtrate was clear and had no cloud point. Gloss stability and blocking point tests were conducted on waxed paper prepared with the filtrate and with an equal blend of wax and filtrate. The test results are summarized in the following table:

| Coating | Blocking Point, ° F. | Gloss | |
|---|---|---|---|
| | | Initial | 7 days |
| Base wax | 108.0 | 34 | 14 |
| Filtrate | 128.5 | 29 | 28 |
| Equal parts filtrate and base wax | 127.0 | 30 | 29 |

EXAMPLE VI

In a plant test 960 gallons of paraffin wax (M.P. 137° F.) containing 6.4% of AC 6 polyethylene was heated to 240° F. in a small tank. This mixture was pumped into a tank containing 25,000 gallons of the same wax at a temperature of 150° F. Thereafter the crude wax-polyethylene mixture was pumped through a steam heated filter charged with 9 tons of attapulgus clay. Filtration rates of the mixture were satisfactory. The polyethylene-wax mixture had a cloud point of 165° F. prior to filtration and no cloud after filtration. Initial gloss of paper coated with the base wax was 28 and 14 after 7 days. Gloss readings of paper coated with the filtered polyethylene-wax blend were 30 initially and 27 after 7 days.

EXAMPLE VII

In another plant test 25,000 gallons of crude paraffin wax (M.P. 137° F.) containing 0.2% of AC 6 polyethylene was clay treated at 180° F. The filtered polyethylene-wax blend was clear and did not have any cloud point. Gloss results for the blend were: Initial—30 and after 7 days—28; whereas the base wax had an initial value of 29 and 17 after 7 days.

EXAMPLE VIII

Equal parts of refined base wax (M.P. 135° F.) and Epolene C polyethylene were melted together at 165° F., mixed until homogeneous and filtered with celite. An additional quantity of molten base wax was added to the filtrate to give a concentration of 0.1% polyethylene in the final blend. The initial gloss results were 33 for both the base wax and final blend. However, after 7 days the gloss results were 13 for the base wax and 30 for the blend.

Viscosities of the wax-soluble polyethylene-wax compositions of the examples were substantially the same as viscosity of the base waxes at normal coating temperatures.

Examination of the data shows that the wax compositions prepared in accordance with the present invention have significantly improved the gloss stability of waxed paper prepared with such compositions. It will be apparent to one skilled in the art that the disclosed invention affords a simple and inexpensive method for preparing homogeneous polyethylene-wax compositions which have superior physical and functional properties. Special methods for preparing polyethylene-wax compositions such as, heating the materials to temperatures above 210° F. or resorting to complicated milling operations and then heating the milled mixtures to elevated temperatures to get the polyethylene dispersed in the wax are obviated by the present invention. Further advantages are afforded the wax user in that precautionary measures and special handling procedures are not necessary to keep the polyethylene suspended in the molten wax during use in order to obtain uniform coatings.

Percentages given herein and in the claims are weight percentages unless otherwise stated.

Although the present invention has been described with reference to specific embodiments thereof, the invention is not to be considered as limited thereto but includes within its scope such modification and variations as come within the spirit of the claims.

I claim:

1. The method of forming a paraffin wax containing wax-soluble polyethylene which comprises: forming a body of molten paraffin wax; adding to the molten paraffin wax low molecular weight polethylene containing polyethylene fraction soluble in the paraffin wax and fraction insoluble in the paraffin wax; filtering the paraffin wax-polyethylene mixture to obtain a filtrate consisting of paraffin wax containing said wax-soluble polyethylene fraction.

2. The method of claim 1 wherein said paraffin wax has a melting point of from about 120° F. to about 140° F.

3. The method of claim 1 wherein the amount of said wax-soluble polyethylene fraction is from 0.1 to about 10%.

4. The method of claim 1 wherein said filtering step is conducted in the presence of attapulgus clay.

5. The method of forming a paraffin wax blend containing from 0.01 to about 10 weight percent of wax-soluble polyethylene which comprises: forming a body of molten paraffin wax; adding to the molten paraffin wax low molecular weight polyethylene containing polyethylene fraction soluble in paraffin wax and fraction insoluble in the paraffin wax; filtering the resultant wax-polyethylene mixture to obtain a filtrate consisting of paraffin wax containing said wax-soluble polyethylene fraction; and blending with said filtrate an amount of molten paraffin wax sufficient to form said wax blend.

References Cited by the Examiner
UNITED STATES PATENTS

| | | |
|---|---|---|
| 2,638,459 | 5/1953 | Bowman et al. |
| 2,969,340 | 1/1961 | Kaufman et al. |
| 2,988,528 | 6/1961 | Tench et al. |

OTHER REFERENCES

Warth, The Chemistry and Technology of Waxes, Reinhold Pub. Corp., N.Y., pp. 506–508 and 516–518, 1956.

MORRIS LIEBMAN, *Primary Examiner.*
ALPHONSO D. SULLIVAN, *Examiner.*
P. M. COUGHLAN, D. C. KOLASCH, B. A. AMERNICK, *Assistant Examiners.*